United States Patent [19]
Naf

[11] Patent Number: 5,499,659
[45] Date of Patent: Mar. 19, 1996

[54] PROCESS FOR THE SEALING AND INTERNAL REPAIR OF SYSTEMS OF LAID CONDUITS

[76] Inventor: Werner Naf, Weingartenstrasse 2, CH-8820 Wadenswil, Switzerland

[21] Appl. No.: 186,440

[22] Filed: Jan. 25, 1994

Related U.S. Application Data

[62] Division of Ser. No. 838,191, filed as PCT/EP91/01210, Jun. 27, 1991, abandoned.

[30] Foreign Application Priority Data

Jul. 3, 1990 [CH] Switzerland ............................ 02206/90
Oct. 3, 1990 [CH] Switzerland ............................ 03188/90

[51] Int. Cl.$^6$ ................................................... F16L 57/00
[52] U.S. Cl. ........................... 138/97; 264/36; 29/402.01; 427/235; 427/236
[58] Field of Search ..................... 138/97, 98; 427/235, 427/236, 237; 285/925; 264/36; 29/402.01, 402.09

[56] References Cited

U.S. PATENT DOCUMENTS

| | | | |
|---|---|---|---|
| 2,331,824 | 10/1943 | Buckingham | 138/97 |
| 3,144,049 | 8/1961 | Ginsburgh | 138/97 |
| 3,287,148 | 11/1966 | Hilbush | 138/97 |
| 3,356,777 | 12/1967 | Barrett | 264/36 |
| 3,556,831 | 1/1971 | Schinabeck et al. | 138/97 |
| 3,578,479 | 5/1971 | Packo | 138/97 |
| 3,727,412 | 4/1973 | Marx et al. | 138/97 |
| 3,946,125 | 3/1976 | Scheiber | 138/97 |
| 3,958,606 | 5/1976 | Viramontes | 138/97 |
| 4,311,409 | 1/1982 | Stang | 138/97 |
| 4,327,132 | 4/1982 | Shinno | 138/97 |
| 4,432,798 | 2/1984 | Helferich et al. | 106/38.3 |
| 4,503,613 | 3/1985 | Koga | 138/97 |

FOREIGN PATENT DOCUMENTS

| | | |
|---|---|---|
| 1980688 | 2/1989 | Australia . |
| 3119360 | 12/1982 | Germany . |
| 2106009 | 4/1983 | United Kingdom . |

*Primary Examiner*—Gary K. Graham
*Attorney, Agent, or Firm*—Ladas & Parry

[57] ABSTRACT

A process for the sealing and internal repair of systems of laid conduits in which a sealant is introduced into the leaky conduit by means of air, the sealant being dry, finely ground, water-swellable bentonite; a dry, hydraulically disintegratable plastic dispersion preparation; or a mixture thereof. The conduit is then filled with a fluid, the fluid being either water or a mixture of steam and air. Alternatively, the sealant is introduced into the leaky conduit by means of water, the sealant being a finely divided, inert material. The conduit is emptied and compressed air charged with particles of an abrasive substance is blown through it. The conduit is then internally coated by blowing into it a solvent-free epoxy resin containing a hardener and fibers.

24 Claims, 6 Drawing Sheets

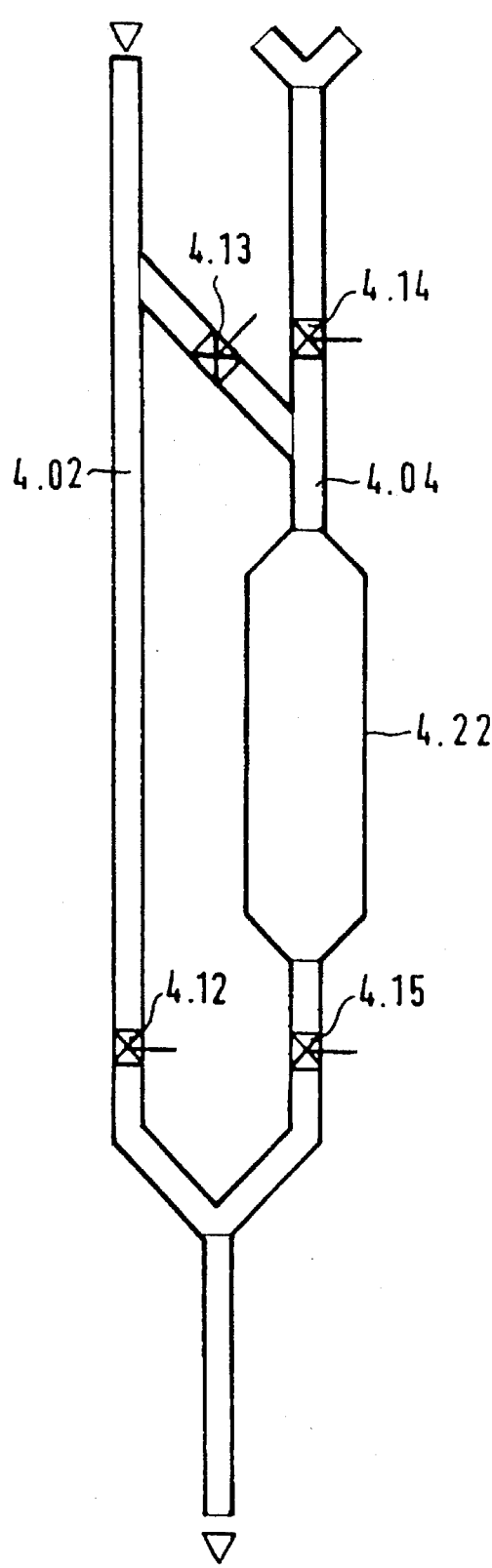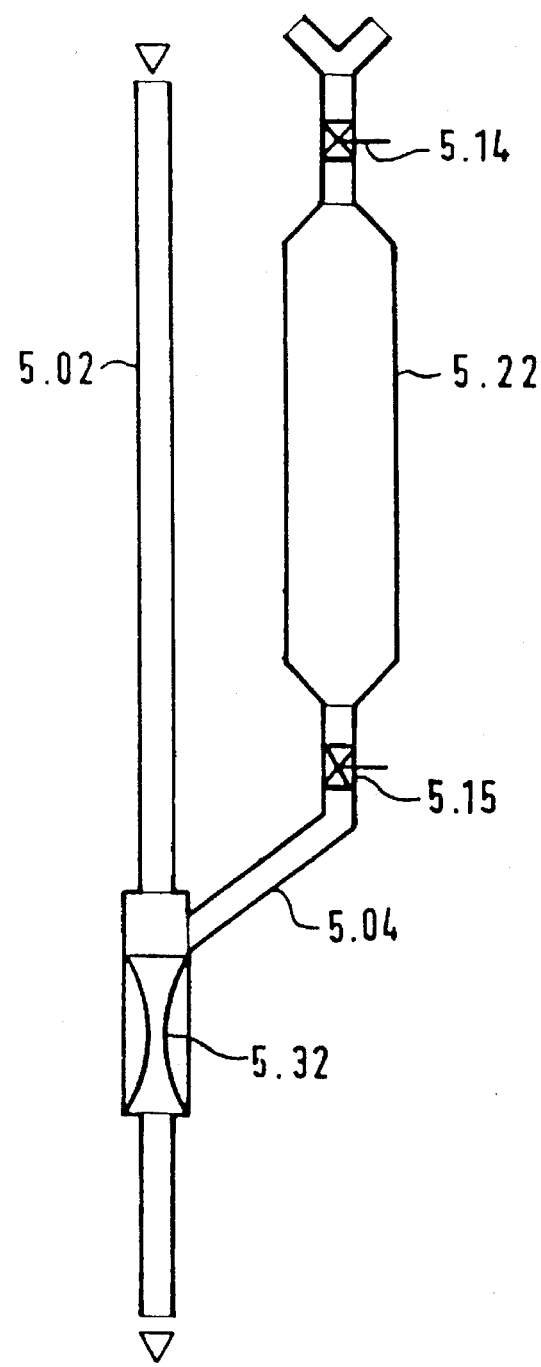
Fig. 4
Fig. 5

PROCESS FOR THE SEALING AND INTERNAL REPAIR OF SYSTEMS OF LAID CONDUITS

This is a divisional of application Ser. No. 07/838,191 filed as PCT/EP91/01210, Jun. 27, 1991, now abandoned.

BACKGROUND OF THE INVENTION

The present invention relates to a process for the sealing and internal repair of systems of laid conduits having a small internal diameter, in which sealing is carried out by blocking a leak by means of an introduced sealant and internal repair is carried out by abrasively blowing out and recoating of the conduit with resin material. Such conduits are, for example, feed and discharge conduits for water or gas in residential, industrial and municipal installations up to a diameter of about 200 mm; this includes domestic and industrial sewage conduits up to the mains.

The problem of damage and encrustation of such conduits has been known for along time. Such damage is due, among other things, to corrosion, movement and vibration of the earth round the conduits; encrustations are due, in particular, to lime deposits from the water, to rust formation in the conduit, to other deposits from the water, to reaction products between substances entrained in the water and the conduit metal etc. Combinations of the above-mentioned effects are also known.

This damage or these encrustations are particularly undesirable in the case of conduits which are fixed in a wall or laid in the ground; of course, conduits are usually laid in this manner nowadays.

Sealing and blocking techniques for laid conduits are also known from the patent literature:

U.S. Pat. No. 3,287,148 teaches a process for sealing laid gas conduits by blowing in a foamed sealing emulsion. The foam settles on the internal wall and condenses there. In the case of leaks, it tends to settle in larger quantities.

This method is expressly suited only to gas conduits; solid additions to the sealing emulsion are neither taught nor made obvious.

The process according to U.S. Pat. No. 3,727,412 describes a repair process in which the conduit portion with the leak is sealed at the front and rear. A specially stablised emulsion is then pressed in which issues at the leak, is destabilised there and coagulates so that the leak is sealed.

Actual solid sealing materials are not therefore pressed in and the vehicle is water, not gas.

U.S. Pat. No. 4,311,409 teaches the sealing of leaks in laid conduits by means of very fine substances having a high capillary action. The very fine substance is arranged externally at the leak and is watered there. The capillary pressure thus obtained counteracts the delivery pressure of the medium flowing in the conduit.

The very fine insulating material is laid onto the conduit from the exterior, after excavation of the leak (FIG. 1).

Finally, U.S. Pat. No. 4,503,613 describes a process and an apparatus for the internal repair of laid conduits by means of "plastic mist" conveyed in a gas stream. It cannot be seen clearly from the patent specification whether actual leaks are also sealed with it and, moreover, it does not appear immediately possible to produce the plastic mist.

Nowadays, laid utility conduits are also cleaned by means of compressed air with and without the addition of sand and reactive resins are also atomised by means of compressed air into conduits which have been precleaned in this way.

With a relatively known method, of cleaning on a practical basis, compressed air is charged from optionally travelling compressor installations via a distributor into the conduit to be cleaned. In a first phase, only air which has been heated by compression is predried. Sand is subsequently added in the air stream in a second phase. It is important that the air and sand mixture is guided with a spiral movement through the conduit; normal movement of the mixture is explicitly described as ineffective. In a third phase of the known process, a reactive resin is injected into the conduit and distributed therein, again by means of a spirally moved compressed air stream.

GB A 2 140 337 teaches such a process. A characteristic of this process is that both the cleaning stream and the resin through-put stream flow in a pulsating manner through the conduit to be repaired. Furthermore, the sizes and quantities of the abrasive particles added to the cleaning stream are not defined, and the addition of bonding agents with grain sizes which are also defined to the repair resin is not mentioned.

SUMMARY OF THE INVENTION

The process according to the invention for sealing, cleaning and re-coating the internal walls of utility water conduits differs from the discussed methods basically in that it is optimised as an overall process and therefore also leads to rapid and reliable results.

The process according to the invention for the sealing and internal repair of systems of laid conduits having a small internal diameter in which sealing is carried out by blocking the leakage by means of an introduced sealant and internal repair is carried out by abrasive blowing out and recoating of the conduit with resin material, is characterised by the following process steps:

after detection of one or more leakages in a portion of conduit and—optionally—after drying out the portion by means of heated compressed air (a) either introduction and blowing in of a sealant containing dry, very finely ground, water-swellable bentonite and/or a hydraulically disintegratable plastic dispersion drying preparation as well as inert additives, or introduction by means of water of finely divided inert material having a specific gravity of $1\pm0.8$ g cm$^{-3}$, then after possibly blowing through the conduit which is charged with the sealant and is optionally emptied, by means of very finely divided abrasive substances, charging and holding the conduit with a steam/air mixture at >2 bar excess pressure or filling or perfusion with water in/through the conduit, if the introduced sealant was dry, and, after detection of the improved impermeability of the conduit (b) continuous blowing through of the conduit for internal cleaning with compressed air which is charged with particles of abrasive substance having a Moh's hardness of >4 and an average grain size of <2 mm and—optionally—with a small content of said dry bonding agent, and, finally, (c) introduction and blowing in of solvent-free epoxy resin mixture which contains the hardener and is loaded with cellulose fibres having a length of $40\pm10$ mm and/or glass fibres having a length of $5\pm3$ mm for internally coating the conduit.

The leak in the portion of conduit can be detected by determining the pressure drop therein, by channel thermography or by channel TV.

In particular, the powdered dry sealant is poured into a conduit attachment, the conduit attachment is connected to the inlet of the portion of conduit and the sealant is either blown by compressed air into the conduit and, while maintaining a pressure difference of >1 bar, is blown between inlet and outlet so that the sealant accumulates at the leakage point or—optionally—air is removed at the leakage points either by means of lances guided downwardly from the top at the leakage point or by means of lances pushed into the conduit and the accumulation of the sealant at the leakage point is thus promoted.

Next, the steam is fed into the compressed air conduit by means of an injector and the conduit part to be repaired is perfused with the steam/air mixture until the steam issues at the conduit end, whereupon the pressure is built up in the conduit.

During the wet blocking operation, the finely divided inert agent is stirred in water and the mixture is continuously pressed in through the conduit while maintaining a pressure drop of >0.1 bar.

During the subsequent abrasive blowing out operation, the air pressed through the conduit is continuously charged with the abrasive agent, and abrasive agent and removed lining material is filtered from the air at the conduit outlet.

The dry sealant for blocking conduits to be repaired by means of air is characterised by contents of very finely divided swellable bentonite of 30±20% by weight and/or of very finely divided, hydraulically disintegratable, water-insoluble or water swellable dispersion dry preparation based on polyacrylic acid esters, styrene copolymers or PVAC copolymers of 20±8% by weight as hydraulically reacting binder.

In particular, said sealant is characterised by contents of dried light expanded clay pellets of <20 mm $\emptyset_A$ and/or of polystyrene foam beads of <6 mm $\emptyset_A$ and/or of cork particles of about <4 mm $\emptyset_A$ and/or of very finely divided diatomaceous earth (Aerosil$^R$) of d>1 g.cm$^{-3}$ as inert additives, wherein to the hydraulically reacting binders, up to 10% by weight of their mass of very finely ground Portland cement can be added.

The finely divided inert material for blocking conduits to be repaired in the water stream is characterised in that it contains and/or consists of fine beads of expanded clay or glass having a specific gravity <1.8 g cm$^{-3}$, plastics foam parts or cork particles having a specific gravity >0.2 g.cm$^{-3}$ and very finely divided diatomaceous earth having a compactness ~1.4 g.cm$^{-3}$.

The application of the above-described process for the internal repair of laid conduit systems—in particular of water conduit networks—is characterised by the following process steps:

determination of a portion of a system, i.e. a group of supply conduits to a conduit main line, which supply conduits have similar pressure drops to the main line and open at substantially the same level into the main line plus the portion of the main line to the entry region of the following group of supply conduits;

opening of the supply conduit ends and of the staged end of the main line connection of the compressed air conduits to the supply conduit ends and—optionally—to the more highly positioned main line portion and implementation of the sealing and internal repair process according to one of the described methods.

BRIEF DESCRIPTION OF THE DRAWINGS

FIGS. 4 and 5 show conduits to be repaired with resin containers attached thereto.

DETAILED DESCRIPTION OF THE PREFERRED EMBODIMENT

Figure 1:
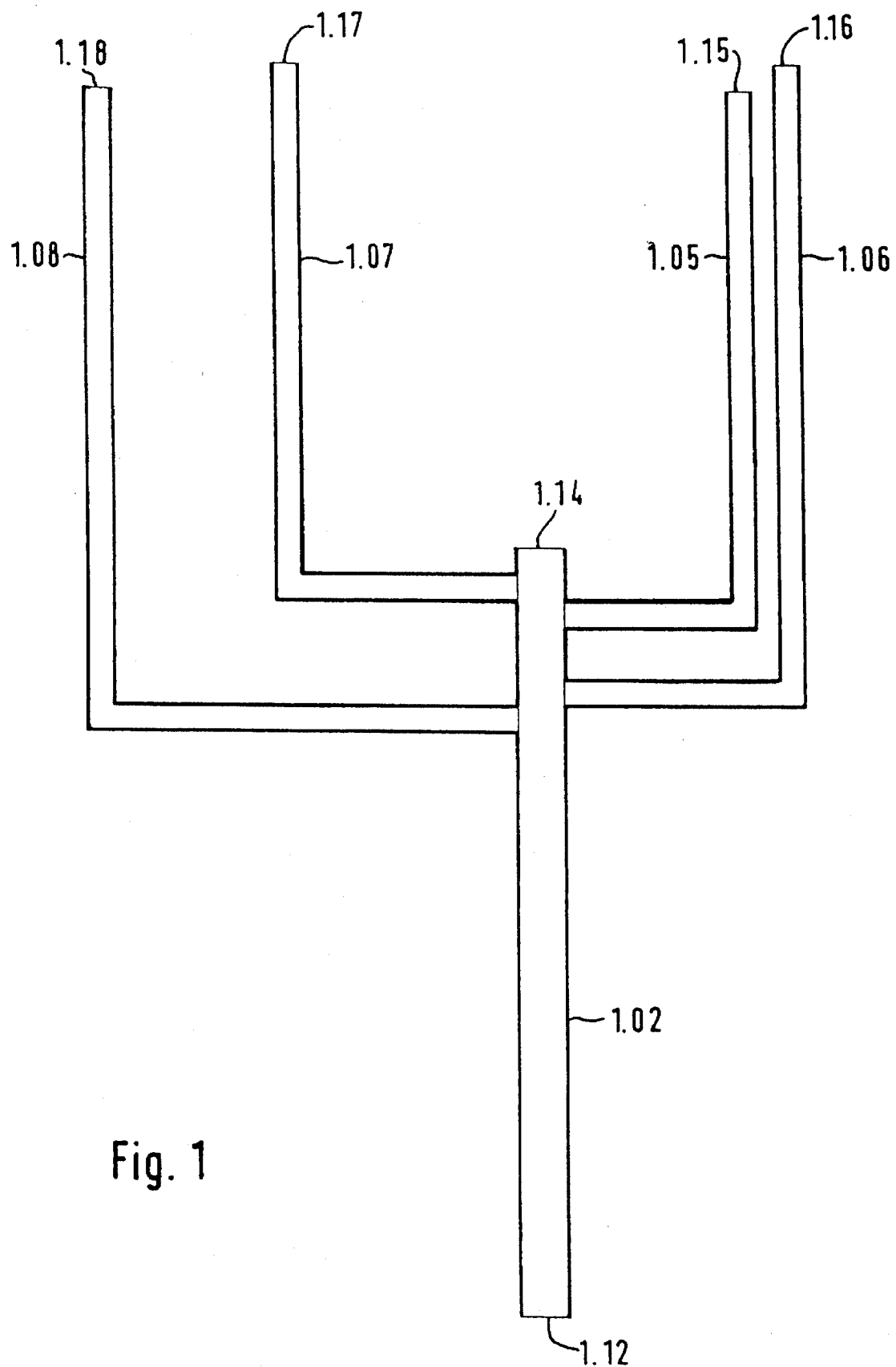
FIGS. 1 and 2 show laid conduit systems typical of those to be repaired by the disclosed processes.
Figure 2:
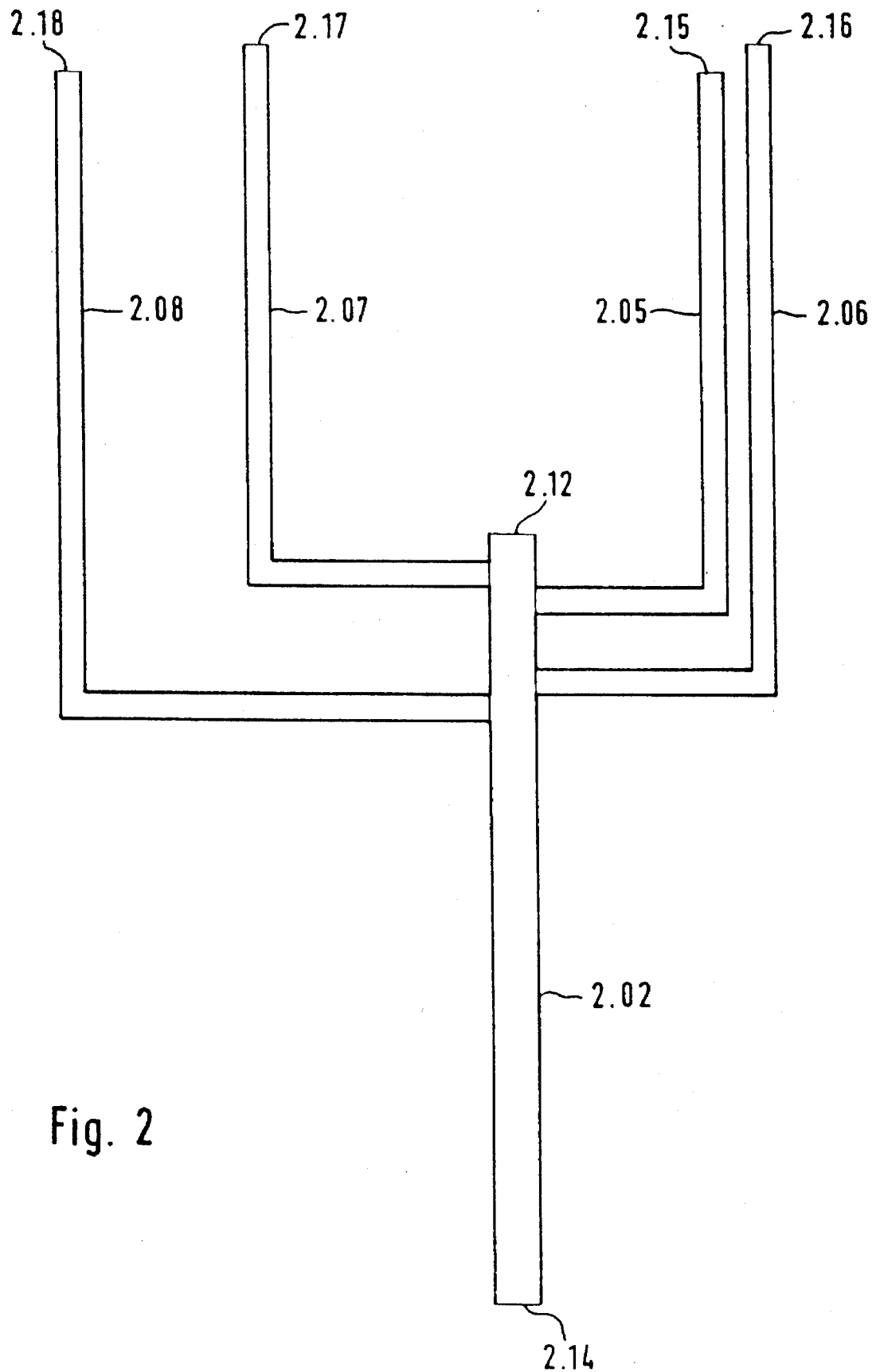

This application advantageously occurs with those system portions which either comprise a main line 1.02 from inlet 1.12 to outlet 1.14 and supply conduits 1.05 to 1.08 with the corresponding openings 1.15 to 1.18 or a main line 2.02 from inlet 2.12 to outlet 2.14 and supply conduits 2.05 to 2.08 with the corresponding openings 2.15 to 2.18.

When blowing out such system portions, the compressed air connections are arranged at 1.14 to 1.18 such that blowing is carried out in a co-current or counter-current, these connections being actuated by means of change-over valves.

During the introduction of resin, the resin composition is advantageously introduced into the blown out conduit in lump or atomised form in predetermined quantities via the change-over valves and is blown through by compressed air.

The apparatus for carrying out the above-described sealing and internal repair process by means of air comprises, in addition to a mobile air compressor installation, an apparatus for charging the compressed air with abrasive substances, an installation for mixing and optionally for conveying the resin compositions and an end separator for sand and resin droplets, in particular a compressed air distributor 3.02 with air supply conduit 3.04 and air delivery conduits 3.05 to 3.07, the conduits carrying valves and pressure measuring devices 3.15 to 3.27 among other things with which apparatus it is possible—together with conventional attachments and pressure measuring devices—both to determine the pressure drop in individual conduit lines at different p and m and also to drive the automated repair programs.

The same apparatus also comprises change-over valves either with main line 4.02, subsidiary line 4.04, the necessary valves 4.12 to 4.15 and a resin container 4.22 preferably with inspection glass, for the lump-wise introduction of the resin composition or with main line 5.02, subsidiary line 5.04 with valves 5.14, 5.15 as well as resin container 5.22, preferably with inspection glass, and with ejector 5.32 for spraying in the resin composition.

It can immediately be seen that such an apparatus can be equipped directly with a programmable measuring, calculating and regulating installation for the automated implementation of the blowing out and resin introduction phases after determination of the stages, after application of the connections and after input of the necessary characteristics.

The similar apparatus for carrying out the sealing and internal repair process by means of a water stream comprises, in addition to the usual feed and discharge conduits, auxiliary devices etc., a pressurised water supply (7.01), a silo (7.02) for the receiving and continuous delivery of the finely divided inert materials, a feed and mixing section (7.03), a supply conduit for mixing with measuring devices (7.04) for the conduit (7.10) to be repaired, a delivery conduit (7.21) with collecting screen or separator (7.22) and optionally return conduit (7.23) for the water.

Examples illustrating the process according to the invention, the apparatus and the application will now follow (Examples 1 to 3 dry blocking, Example 4 wet blocking).

As Example 1 of the process according to the invention there is now reported an application thereof for the cleaning of a supply water conduit in a private swimming pool.

Preliminary inspection of the conduit revealed no leaks, impermeability or the like.

After closing all branches, the inlet and outlet of this conduit were opened on the day beforehand.

On the working day itself, the conduit was first pre-dried with compressed air from a compressor. The compressed air was pre-dried in a moisture extractor prior to admission into the conduit.

The necessary quantity of air emerged (as also for the cleaning and coating afterward) from the following Table:

| NW  25 mm/1"   | Pipe length to 100 m | 7.5 m$^3$/min  |
|----------------|----------------------|----------------|
| NW  40 mm/1 ½" | "                    | 14.0 m$^3$/min |
| NW  50 mm/2"   | "                    | 17.0 m$^3$/min |
| NW  80 mm/3"   | "                    | 26.0 m$^3$/min |
| NW 100 mm/4"   | "                    | 30.0 m$^3$/min |
| NW 150 mm/6"   | "                    | 45.0 m$^3$/min |

In the present case, the total length of the conduit was about 80 m; it consisted mainly of 1 ½" and 2" pipes. The conduit was partially fixed in the wall and partially laid in the open in the sub-floor.

Preliminary drying lasted about 40 minutes. A special separator was mounted at the conduit outlet; the issuing fine solid material (apparently mainly lime deposits and rust) passed into a special separator.

A feeder for the abrasive agent (dry normal sand of 2 to 4 mm with addition of waste corundum of 1 to 2 mm grain size) was then fitted between compressor and air inlet into the conduit. A separator with a cyclone divider with manometer and regulating valve was installed at the air outlet. The process was then carried out for about 12 minutes at an average excess pressure of about 1.2 bar with maximum compressor output and addition of abrasive agent. After the blowing operation, about 300 kg of sand had been blown through the conduit to be cleaned. At the end of the blowing operation, the air had a temperature of ~60° C. as it issued from the separator.

After blowing out for a short period, 5 kg of adhesive resin having the following formulation were prepared batchwise in each case; the resin was prepared in each case such that it had a viscosity higher than $2.10^4$ m Pa.s at about 25° C. The charges were then poured as lumps into the air inlet nozzle (vertically) at the beginning of the conduit. The compressed air was then immediately connected and the lumps blown in until no more clear resistance was detectable. A further lump of resin was then introduced, and so on, five times in total. Only then was a delivery of resin from the end of the conduit detected.

Basic formulation of adhesive resin for coating:

| Epoxy resin: Bis-A or Bis-A/F type | 47% by weight  |
|------------------------------------|----------------|
| Hardener: aliphatic polyamine adduct | 19% by weight |
| Titanium dioxide                   | 8% by weight   |
| Silicate filler                    | 21% by weight  |
| Thixotropic material (Aerosil$^R$) | 5% by weight   |
| Total                              | 100% by weight |

Blowing through was then carried out for a further 30 minutes, and the conduit was sealed at the top and bottom at the end of the blowing period.

Two days later, the conduit was reconnected to the network and thoroughly flushed beforehand.

Filling of the tank after cleaning of the conduit lasted about 9 hours and produced clear water; prior to cleaning, filling lasted more than 14 hours and the water was sometimes rust red in colour.

Example 2

A y-part which was 60 m long in total, of an approximately 10 cm diameter sewage conduit which extended from two EFH after the junction under a road with a height difference of about 3 m and a total of four substantially 90° bends exhibited a leakage (obvious loss of water) into the main at the entrance on inspection.

Figure 3:
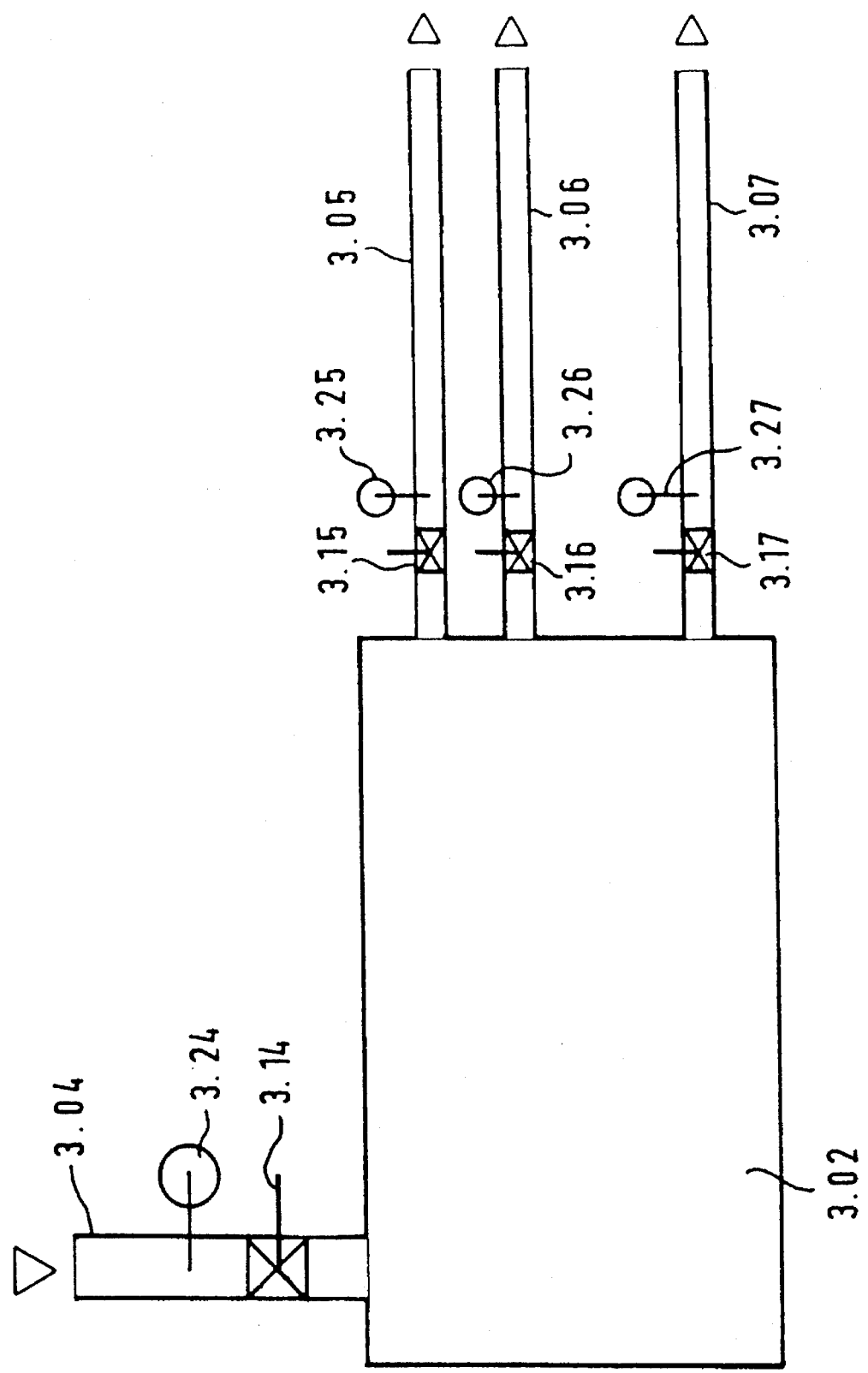
FIG. 3 shows a compressed air distributor.

This conduit part was sealed at the two entrances into the EFH and was connected at the outlet (i.e. at the entrance into the main, this point being exposed owing to a new construction) to a compressed air distributor according to FIG. 3 connected to the mobile compressor. It could then be detected that an excess pressure of about 0.2 bar could not be maintained in the conduit part (confirmation of the leak and simultaneous identification thereof as gas permeable).

The following sealant was poured, after thorough mixing, into a portion of conduit having a length of 1 m and a diameter of 10 cm, which could be inserted tightly between conduit end and outlet of the compressed air conduit at the distributor:

about 5 l of Styropore beads $\emptyset_A$~2 cm, dry, about 1 l of Mowilith$^R$ powder DM 200P, about 50 g of PC 300Z.

The mixture was blown by means of compressed air into the conduit to be renewed. It was found that owing to slight opening of the closures at the two entrances, the blowing in of the sealant took place more easily (P~1 bar excess pressure). This blowing in operation was repeated four times.

The conduit part was then filled from the outlet with water and was left for about 2 hours.

After letting out the water and blowing out the conduit, the conduit was found to be much more impervious (possible excess pressure about 0.6 bar).

Hereupon, cleaning was carried out by means of abrasive jets with a sand/waste corundum mixture and a resin internal coating was provided by means of the resin mixture specified in Example 1 to which E-glass staple fibres having a length of about 2 mm and a specific gravity of 2.56 g.cm$^{-3}$ had been added.

On completion of the resin internal coating of the conduit part to be repaired (resin discharge at both entrances), after the curing of the resin and after the flushing of the conduit, virtually no more loss of water could be detected.

Example 3

Figure 6:
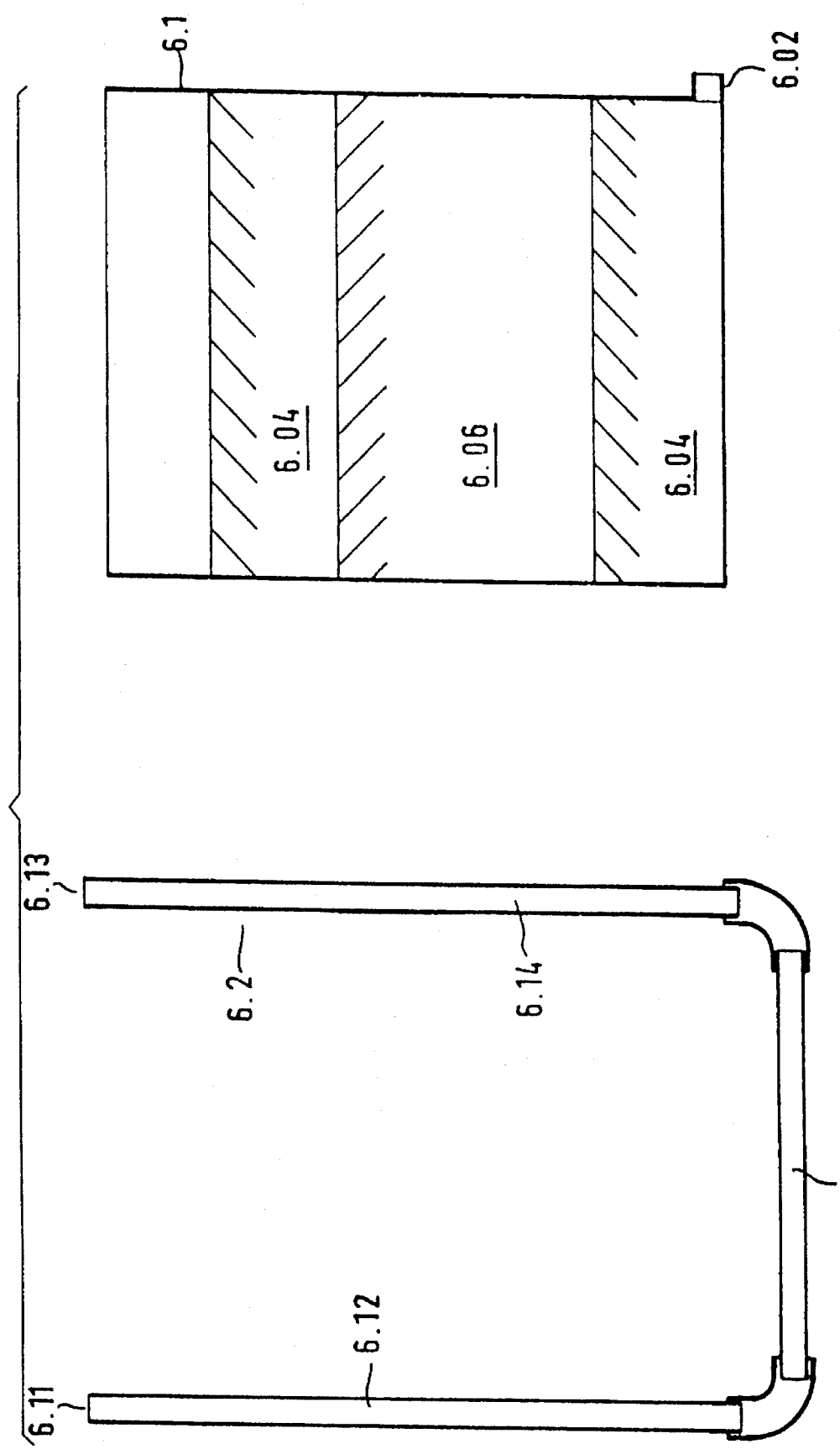
FIG. 6 shows an apparatus for simulation of leaking in conduit systems.
Figure 7:
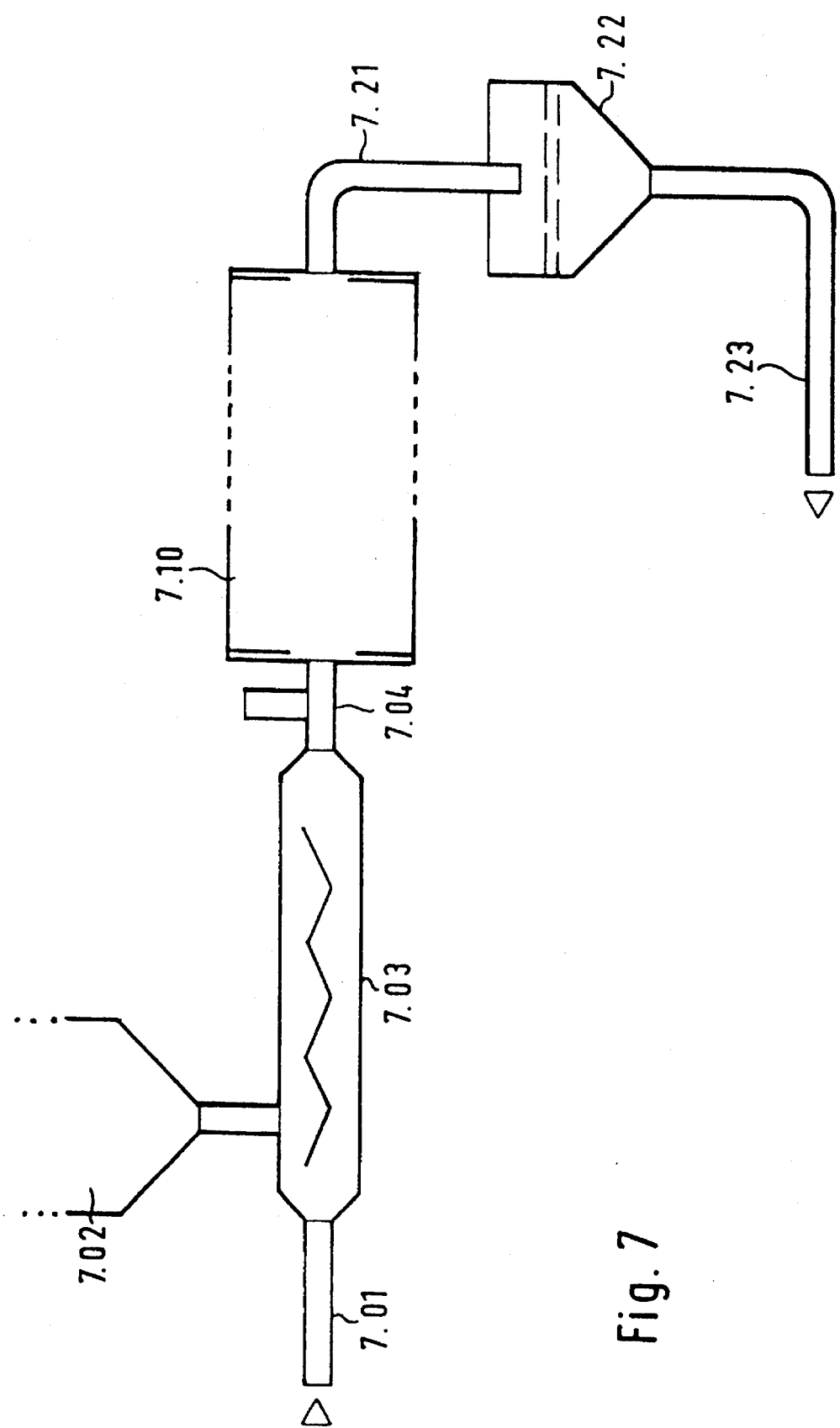
FIG. 7 shows apparatus for sealing laid conduit systems by water stream.

The inventors/applicants have installed a simple installation for further completion of the method according to the invention, in particular seal technology (see FIG. 6).

Three layers are poured into the container 6.1 (for example a barrel) with bottom outlet 6.02:6.04 fine sand ($\emptyset_A$ to 2 mm) and 6.06 gravel ($\emptyset_A$ 10 to 20 mm).

When pouring in the layer of gravel 6.06, the sample pipe 6.2 is incorporated into the layer, the horizontal part 6.16 thereof comes to rest substantially in the centre of the gravel layer. Filling is then completed.

At 6.11 it is possible to connect or install:

the compressed air conduit from the compressor, the manometer (optionally with display), gas or steam connection, the filling pipe for the various sealing mixtures and a control valve (ball valve), at 2.03:

a control valve a manometer and a material trap.

Bores of various diameters can be arranged in the horizontal part 6.16 of the sample pipe. Moreover, this "horizontal" part is not always horizontal but can also contain a 90° curve which extends upwardly/downwardly or to the left/right.

With this simple apparatus, it is therefore possible to simulate in practice:

gas-impermeable and gas-permeable leaks (in sand or in gravel)

leaks in straight conduit sections and in curves, blocking with sealed conduit ends or with constantly maintained pressure difference.

It has been found, after the initial investigations, that dispersion powders such as EMU$^R$ powder 120 FD (BASF), Mowilith$^R$ powder DM$_R$ 200 P (Hoechst), Vinnapas$^R$ dispersion powder (Wacker) or the like, alone or mixed with Portland cement (special cements with high aluminate contents) are suitable as actual binders.

These agents are disintegrated after the blowing in operation by means of water, steam and/or by a gas supply ($NH_3$, $CO_2$).

Suitable fillers and inert agents for blocking such leakages include Styropore beads, cork particles, finely ground bentonite, very finely divided silica (Aerosil$^R$). The extent to which the two last-mentioned materials also assist the binder in its effect has not yet been clarified at present.

Expanded clay can be used as a filling material if the leak is located at or round the lowest point of the conduit to be repaired.

Aspiration by means of lances (in the case of gas-impermeable leaks) can be carried out with the same installation: a tube having a thickened region at the front is introduced from 6.13 to in front of the leakage point (or is drawn in from the opposite side). As the sealing mixture is being blown in, it is mainly deposited in front or in the region of the aspiration (leakage) point. Material which settles in the pipe itself can easily be removed again afterwards by the abrasive blowing out operation.

Example 4

An enlarged test installation was erected:

A wooden frame having a width of 1.8 m, a length of 5.4 m and a height of 0.9 m approximately in each case was filled to about 0.2 m with a mixture of gravel and sand (grain sizes 0.5 to 8 mm). An M-shaped coiled pipe from 1" gas pipes was laid onto this bed. As mentioned, said coiled pipe had four parallel lines. To create an artificial pressure drop, the U-shaped fittings between the lines only had a ½" $\emptyset_i$. In the third line (as viewed in the direction of flow) one or more 1 cm bores were arranged laterally. The coiled pipe had a respective rising inlet and outlet conduit.

After installation of the coiled pipe, filling was carried out with the same sand and gravel mixture to a height of about 0.7 m.

The wet blocking mixture was stirred in a 160-1 barrel. It was difficult to achieve satisfactory homogeneity in the mixture. In particular, liquid blocking mixtures consisting of 100 parts by weight of water, 100 parts by weight of plastic resin foam particles of 2 to 4 mm and one part by weight of Aerosil$^R$ 90 were examined. The mixing barrel had a lower outlet with a check valve. After achieving apparently satisfactory homogeneity, a mobile centrifugal pump was connected to convey suspensions. This produced a $\Delta$ p of 2 bar excess pressure maximum with a displacement of about 50 1/min (~1 1/s).

The connecting conduit from the pump to the entrance conduit of the test installation was mobile (metal tube), had a rapid connection (flange) and was provided with a relatively accurate manometer (range 1 to 3 bar, graduation ⅒ bar). The delivery conduit from the test installation, which led to an outlet with preceding filter for the blocking agent, had an identical manometer and, at the same time, a control valve for regulating the flow characteristics.

The tests were carried out as follows in each case:

After connection of the centrifugal pump, the man at the outlet regulated as accurately as possible to 0.5 bar excess pressure and the man at the inlet noted the pressure display on his manometer every 10 seconds. It was found that whenever blocking or at least partial closure of the bore occurred, the pressure display at the manometer 1 (as mentioned, the man at manometer 2 watched the outlet excess pressure of 0.5 bar which was as constant as possible and also kept an eye on a displacement which was as constant as possible), was about 0.1 to 0.2 bar higher.

A state which, in the opinion of specialists, would have led to a genuine seal of the pipe in the case of subsequent internal charging of the pipe with adhesive resin is described as a blockage during the external control of the coiled pipe exposed after the test.

In this context, "wet sealing mixtures" consisting of 100 parts by weight of water, ~8 to 18 parts by weight of rigid EP foam particles having a grain size of 2 to 4 mm and a bulk density of <400 kg/m$^3$ as well as 0.1–1 part by weight of Aerosil$^R$ 90 produced the most convincing results, and the rise in pressure at the manometer 1 (with constant p and v at the outlet) was clearest.

I claim:

1. A process for the sealing and internal repair of at least one leak in a system of laid conduits, the process comprising the following steps:

(a) introducing a sealant into the conduit by means of air;

(b) filling the conduit with a fluid., the fluid cooperating with the sealant to seal the leak;

(c) emptying the fluid from the conduit;

(d) blowing through the emptied conduit compressed air that is charged with particles of an abrasive substance; and (e) then internally coating the conduit by introducing and blowing into it a solvent-free epoxy resin containing a hardener and fibers, the fibers being selected from the group consisting of cellulose fibers, glass fibers, and a mixture of cellulose fibers and glass fibers.

2. The process as claimed in claim 1, wherein the sealant in step (a) comprises a dry, hydraulically disintegratable plastic dispersion preparation.

3. The process as claimed in claim 2, wherein the dispersion preparation is a very finely divided, water-insoluble, water-swellable, dispersion preparation based on a material selected from the group consisting of polyacrylic acid esters, styrene copolymers, and polyvinylacetate (PVAC) copolymers.

4. The process as claimed in claim 3, wherein the dispersion preparation is 20±8% by weight of the sealant.

5. The process as claimed in claim 1, wherein the sealant in step (a) comprises a dry, finely ground, water-swellable bentonite.

6. The process as claimed in claim 5, wherein the bentonite is 30±20% by weight of the sealant.

7. The process as claimed in claim 1, wherein the sealant in step (a) comprises a mixture of dry, finely ground, water-swellable bentonite and a dry, hydraulically disintegratable plastic dispersion preparation.

8. The process as claimed in claim 7, wherein the dispersion preparation is a very finely divided, water-insoluble, water-swellable, dispersion preparation based on a material selected from the group consisting of polyacrylic acid esters, styrene copolymers, and polyvinylacetate (PVAC) copolymers.

9. The process as claimed in claim 8, wherein the bentonite is 30±20% by weight of the sealant.

10. The process as claimed in claim 9, wherein the dispersion preparation is 20±8% by weight of the sealant.

11. The process as claimed in claim 8, wherein the dispersion preparation is 20±8% by weight of the sealant.

12. The process as claimed in claim 1, wherein the abrasive substance in step (d) has a hardness of >4 on the Mohs' scale and an average grain size of <2 mm.

13. The process as claimed in claim 1, wherein the cellulose fibers in step (e) have a length of 40+10 mm. and the glass fibers in step (e) have a length of 5+3 mm.

14. The process as claimed in claim 1, wherein the fluid in step (b) is a mixture of steam and air at ≧2 bar excess pressure.

15. The process as claimed in claim 14, wherein the mixture of steam and air in step (b) is injected into the conduit until the steam and air mixture exits from the conduit, whereupon the excess pressure is increased to ≧2 bar.

16. The process as claimed in claim 1, wherein the fluid in step (b) is water.

17. The process as claimed in claim 1, wherein step (a) is preceded by drying out the leaky conduit with heated, compressed air.

18. The process as claimed in claim 1, wherein the leak in the conduit is located between an inlet portion and an outlet portion of the conduit, and wherein the sealant in step (a) is blown by compressed air through the conduit between the inlet portion and the outlet portion so that the sealant accumulates at the leak.

19. The process as claimed in claim 18, wherein a pressure difference of >1 bar is maintained between the inlet portion and the outlet portion while the sealant is being blown by compressed air through the conduit.

20. The process as claimed in claim 18, wherein a conduit attachment is connected to the inlet portion prior to step (a) and the sealant in step (a) is poured into the conduit attachment.

21. The process as claimed in claim 1, wherein air is removed from the conduit in step (a) so that the sealant accumulates at the leak.

22. The process as claimed in claim 21, wherein the air is removed from the conduit in step (a) by means of a lance guided into the conduit.

23. The process as claimed in claim 22, wherein the lance in step (a) is guided into the conduit through the leak whereby accumulation of the sealant at the leak is promoted.

24. The process as claimed in claim 1, wherein the compressed air in step (d) is filtered when it exits the conduit.

* * * * *